United States Patent [19]

Anderson et al.

[11] Patent Number: 4,661,216
[45] Date of Patent: Apr. 28, 1987

[54] ELECTRODEPOSITING CONIFE ALLOYS FOR THIN FILM HEADS

[75] Inventors: Nathaniel C. Anderson, Pine Island, Minn.; Robert B. Chesnutt, Tucson, Ariz.

[73] Assignee: International Business Machines Corporation, Armonk, N.Y.

[21] Appl. No.: 854,451

[22] Filed: Apr. 21, 1986

[51] Int. Cl.$^4$ ............................................... C25D 3/56
[52] U.S. Cl. .................................................. 204/44.5
[58] Field of Search ............................... 204/44.5, 123

[56] References Cited

FOREIGN PATENT DOCUMENTS 2324 1/1969 Japan .................................. 204/44.5
1026781 4/1966 United Kingdom ............... 204/44.5

OTHER PUBLICATIONS

Journal of Applied Physics, vol. 38, pp. 3409-3410, (1967), "Non-Magnetostrictive Compositions of Fe-Ni-Co Films", by C. H. Tolman.

Primary Examiner—G. L. Kaplan
Attorney, Agent, or Firm—Hugh D. Jaeger

[57] ABSTRACT

A bath for electroplating a high cobalt magnetic alloy material suitable for fabrication of thin film heads. The ternary cobalt-nickel-iron (CoNiFe) alloy electroplating bath composition produces a high cobalt magnetic thin film having high saturation magnetization, a magnetostriction coefficient that is substantially zero, and low coercivity. A process suitable for deposition of the soft magnetic material provides a thin film head where $4\pi Ms$ is higher than 14K gauss, Hc is less than 2oe, 1-10 MHZ permeability is near 1000, and has a near zero magnetostriction.

4 Claims, 6 Drawing Figures

ELECTRODEPOSITING CONIFE ALLOYS FOR THIN FILM HEADS

TECHNICAL FIELD

The present invention relates to an electroplating bath composition for electroplating a coating of a cobalt-nickel-iron (CoNiFe) alloy with low coercivity, high saturation magnetization (4πMs), and 0 or slightly negative magnetostriction (λs) for use in thin film heads for reading and writing. The electroplating bath compositon deposits a Co-Ni-Fe alloy to be used in thin film recording heads.

BACKGROUND ART

In the binary NiFe alloys, when the Fe content is increased to achieve a greater 4πMs, the magnetostriction increases greatly, a greater λs is also presumed to be a major contributor to read back instabilities. This prior art problem has somewhat limited the use of the binary, high Ms, NiFe alloys to write heads only. It has been reported that various compositions of the CoNiFe alloys exist where 4πMs exceeds numerical value of the conventional approximately 81/19 NiFe alloy and have near zero magnetostriction, but these films were prepared using a vacuum deposition process.

U.S. Pat. No. 4,279,707 relates to a nickel-iron electroplating composition bath which provides a permalloy utilized in current thin film heads, and operating parameters that provide excellent compositional uniformity over small topography such as the P2 or second permalloy layer in the thin film head. The techniques taught in U.S. Pat. No. 4,279,707 have been applied to prepare plated NiFe of a 45/55 alloy; however, the high values of the positive magnetostriction resulted in that the thin film heads did write well, but that the heads would not provide for the desired optimized reading due to the high positive magnetostriction.

Cobalt-nickel-iron alloys, including electroplating baths have been known in prior art patents, but the prior art has failed to recognize, most importantly, that a high cobalt content was required to obtain desired attributes for writing, as well as reading for thin film heads. The prior art compositions generally had a low level of cobalt, such as ten percent, which is contrary to the teachings of the present invention as later disclosed. Such prior art compositions are representative of U.S. Pat. Nos. 3,297,418; 3,533,922; 4,036,709; 4,242,710; and 4,430,171. The U.S. Pat. No. 3,297,418 discloses a plating bath composition for depositing NiFeCo thin films. The bath composition includes an aqueous solution of Ni, Fe and Co compounds and also $H_3BO_3$, saccharin, and sodium lauryl sulfate. The U.S. Pat. No. 4,424,710 discloses a plating bath composition for achieving a homogeneous NiFeCo thin film deposition characterized by negative magnetostriction. The plating bath composition includes an aqueous solution of Ni, Fe and Co compounds, also $H_3BO_3$ NaCl, Na Saccharin, and wetting agent. None of these prior art references really appreciate the utilization of a high amount of cobalt for producing a high cobalt alloy magnetic thin film, but were more concerned with nickel concentration. The references were more concerned with low cobalt concentrations with respect to the other concentrations of compositions.

U.S. Pat. No. 3,350,180 discloses a laminated magnetic film device where the magnetic material could be selected from the group including the Fe-Ni-Co alloy; although the cobalt concentration was relatively low with respect to the other compositions. The patent discloses a plating bath compositon for depositing NiFeCo thin films where the bath includes an aqueous solution of Ni, Fe and Co compounds and also $H_3BO_3$, saccharin, and sodium lauryl sulfate.

The concern of the prior art references is that the references teach away from utilizing an electroplating bath composition for producing a high cobalt alloy magnetic thin film. The references all teach the use of a bath that plates a Ni-Fe-Co material utilizing a low percentage of cobalt material contrary to the present invention, which discloses a high percentage of cobalt material with respect to the other compositions.

The publication under Communications, of the *Journal of Applied Physics,* Vol. 38, pages 3409–3410, (1967), discusses "Non-magnetostrictive compositions of Fe-Ni-Co films", by C. H. Tolman, which plots the non-magnetostrictive composition line of the Fe-Ni-Co system as illustrated in FIG. 1. The reference illustrates historically the prior art region of percentage of cobalt and the present invention region of intrinsic induction as a function of the prior art regions, as well as the present invention region.

The present invention overcomes the disadvantages of the prior art by providing an electroplating bath composition for producing a high cobalt magnetic thin film having high saturation magnetization, a magnetostriction coefficient that is substantially zero and low coercivity for use in thin film heads.

SUMMARY OF THE INVENTION

The general purpose of the present invention is an electroplating bath for producing a high cobalt magnetic thin film for thin film heads, the magnetic thin film having a high saturation magnetization for good writing characteristics, a magnetostriction coefficient that is substantially zero, and low coercivity, for good reading characteristics. The Co-Ni-Fe alloy of this invention provides enhanced magnetic characteristics for a thin film head. The electroplating bath composition and operating parameters also provide for excellent uniformity of composition over the topography of a thin film head structure.

According to one embodiment of the present invention, there is provided a CoNiFe electroplating bath composition for producing a high cobalt magnetic thin film having high saturation magnetization, a magnetostriction coefficient that is substantially zero and low coercivity. The electroplating bath composition includes ingredients of $Co^{+2}$ ions in a concentration of approximately 8 to 25 grams per liter, $Ni^{+2}$ ions in a concentration of approximately 1.5 to 12 grams per liter and $Fe^{+2}$ ions in a concentration of approximately 0.5 to 3 grams per liter. The bath also includes boric acid, or the like composition, sodium chloride or the like composition, a stress relieving agent, and a wetting agent. The composition can vary accordingly, causing, of course, variations in the magnetization, the magnetostriction, as well as the coercivity by changes in the deposit composition. The dischargeable ion concentrations utilized can be varied, as well as the salt concentrations, while still operating at low current density and providing for uniform composition of deposit over the topography of a thin film head structure. The operating parameters of the electroplating bath can be at or in ranges of about a pH of 2.5 to 3.5, at about a preferred temperature of 30° C. in a range of 25°-24° C., and operated at a current density of about 3-10 mA per square centimeter or in like ranges.

Significant aspects and features of the present invention are that the electroplating bath composition with the high cobalt provides for a high saturation magnetization necessary for writing; a magnetostriction coefficient at zero or slightly negative, providing for read stability and a coercivity of less than about 2 Oersteds providing for good reading characteristics.

DESCRIPTION OF THE INVENTION

Figure 1:
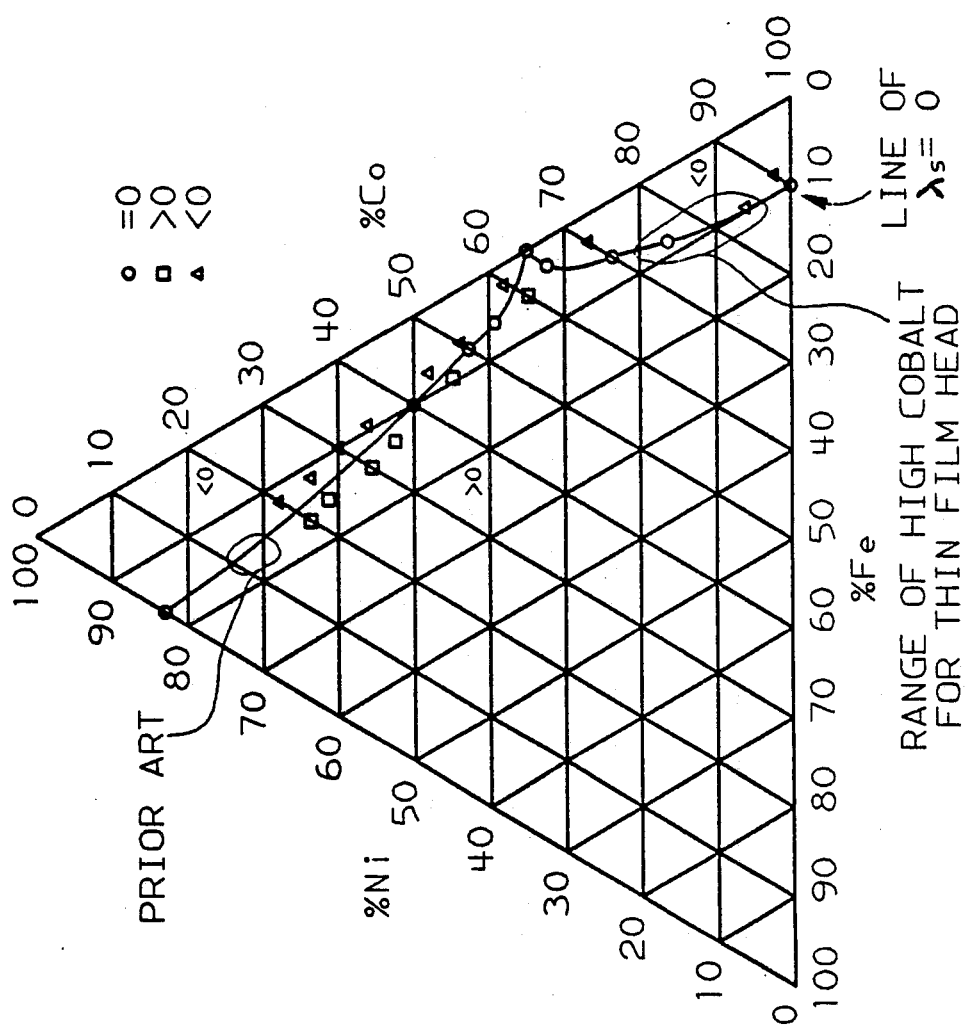
FIG. 1 is a ternary diagram of cobalt-nickel-iron showing the line of zero magnetostriction.
Figure 2:
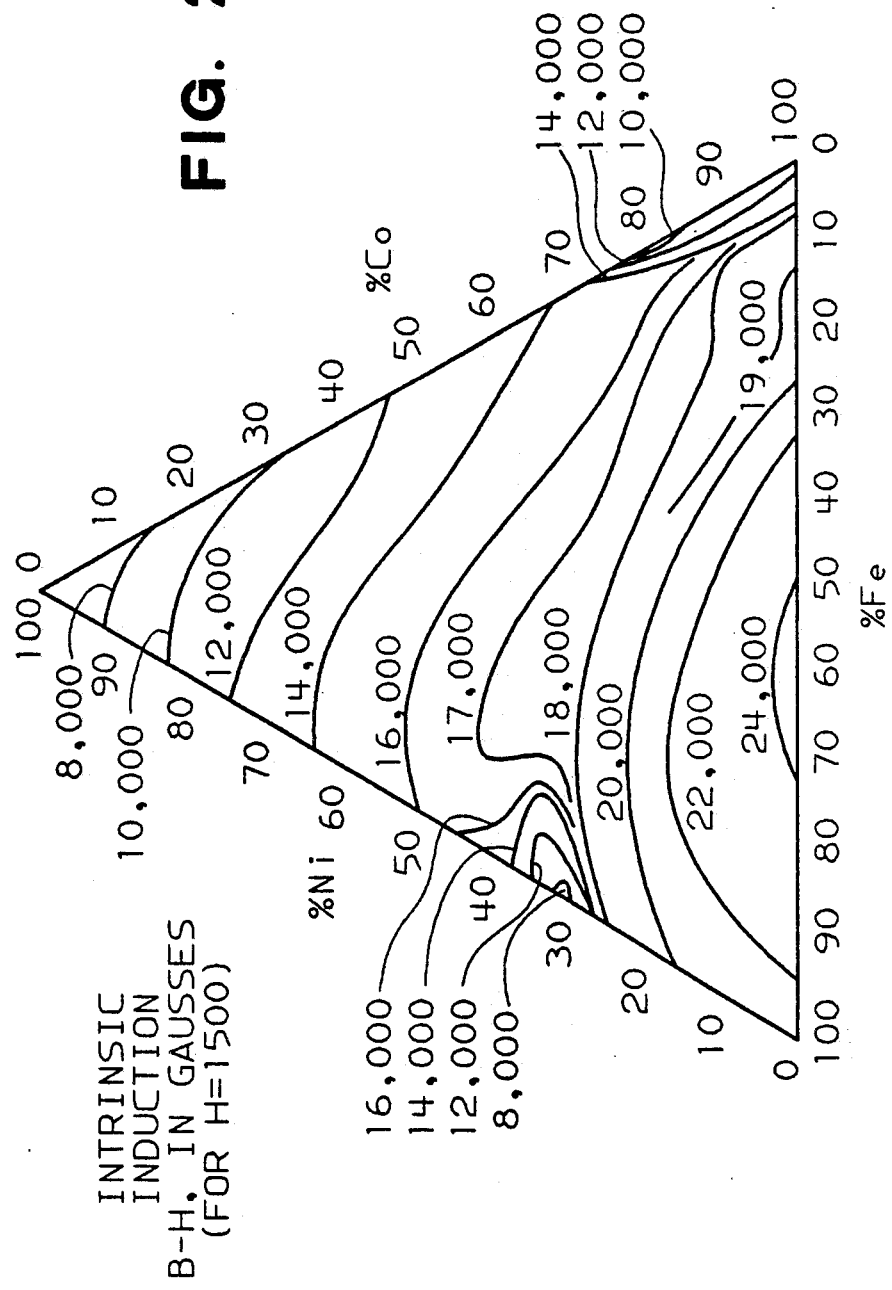
FIG. 2 illustrates a plot of intrinsic induction B-H, in gausses, for cobalt-nickel-iron.

The electroplating bath composition uses cobalt, nickel, and iron for electroplating a high cobalt magnetic material for fabrication of thin film heads that have a high saturation magnetization with a magnetostriction coefficient at zero or slightly negative.

One preferred basic bath composition without the dischargeable ions is set forth in Table 1 for the cobalt, nickel, and iron. Of course, like compositions can be used accordingly in the bath.

TABLE 1

| Composition | Basic Bath Weight per liter | Range |
|---|---|---|
| $H_3BO_3$ | 25 g/l | 10-50 g/l |
| NaCl | 25 g/l | 0-100 g/l |
| Stress Relieving Agent (such as sodium saccharin) | 1.5 g/l | .5-4 g/l |
| Wetting Agent | 0.05 g/l | .01-0.2 g/l |

The dischargeable ion concentrations utilized in low salt concentrations at low current providing for uniform topography can be in the ranges as set forth in Table 2.

TABLE 2

| Dischargeable Ions | Dischargeable Ions Weight/liter | Molar Concentration |
|---|---|---|
| $Co^{+2}$ | 8-25 g/l | .15-.4 M |
| $Ni^{+2}$ | 1.5-12 g/l | .03-.2 M |
| $Fe^{+2}$ | 0.5-3 g/l | .01-.05 M |

The upper molar concentrations can be higher and, of course, are dependent upon the current density, pH, and desired composition of the resultant alloy. The conditions under which the electroplating composition bath is used can be at 30 degrees centigrade, although a higher temperature could be utilized, in a pH range of 2.5 to 3.5, and at a current density of 3 to 9 milliamps per centimeter square. The compositon of the dischargeable ions of the bath chemistry is certainly considered more importat than the current density for obtaining the achievable results as later discussed. A lower pH is desirable in low salt concentrations so as to avoid cloudy films. Ranges can be extended for the ternary system.

One specific example of an electroplating high salt bath composition is delineated in Table 3.

TABLE 3

| Composition | Weight/Liter |
|---|---|
| $CoSO_4.7H_2O$ | 100 g/l |
| $NiCl_2.6H_2O$ | 28 g/l |
| $NiSO_4.7H_2O$ | 13.4 g/l |
| $FeSO_4.7H_2O$ | 12 g/l |
| $H_3BO_3$ | 25 g/l |
| NaCl | 25 g/l |
| Stress Relieving Agent | 1.48 g/l |
| Wetting Agent | 0.05 g/l |

Of course, the salt concentration of the $CoSo_4\ 7H_2O$ can be varied such as in a range of 90-100 g/l. The conditions for plating are preferably 3-9 mA/cm² at a pH of 2.5 and at a temperature of 30° C. For a lower salt concentration, a mid-range current density could be utilized. The salt concentrations can be varied accordingly, whether the bath be a low salt bath or a high salt bath. Also, the nickel could be entirely supplied by either the chloride or sulfate salt, although the mixed source is preferable.

The specific examples of an electroplating bath composition are delineated in Tables 4 and 5 for 25 liter baths.

TABLE 4

| Composition | Weight |
|---|---|
| $CoSo_4.7H_2O$ | 2500 g |
| $NiCl_2.6H_2O$ | 700 g |
| $NiSo_4.7H_2O$ | 335 g |
| $FeSO_4.7H_2O$ | 300 g |
| $H_3BO_3.7H_2O$ | 625 g |
| NaCl | 625 g |
| Stress Relieving Agent | 37.5 g |
| Wetting Agent | 1.25 g |

The current density is about 5 mA/cm², the temperature is approximately 30 degrees centigrade, the pH is about 2.5 and the rate of electroplating is about 675 ang/minute.

TABLE 5

| Composition | Weight |
|---|---|
| $CoSo_4.7H_2O$ | 1200 g |
| $NiCl_2.6H_2O$ | 200 g |
| $FeSO_4.7H_2O$ | 100 g |
| $H_3BO_3.7H_2O$ | 625 g |
| NaCl | 625 g |
| Stress Relieving Agent | 37.5 g |
| Wetting Agent | 1.25 g |

The current density is about 5 mA/cm², the temperature is approximately 30 degrees centigrade, the pH is about 2.5 and the rate of electroplating is about 675 ang/minute.

Figure 3:
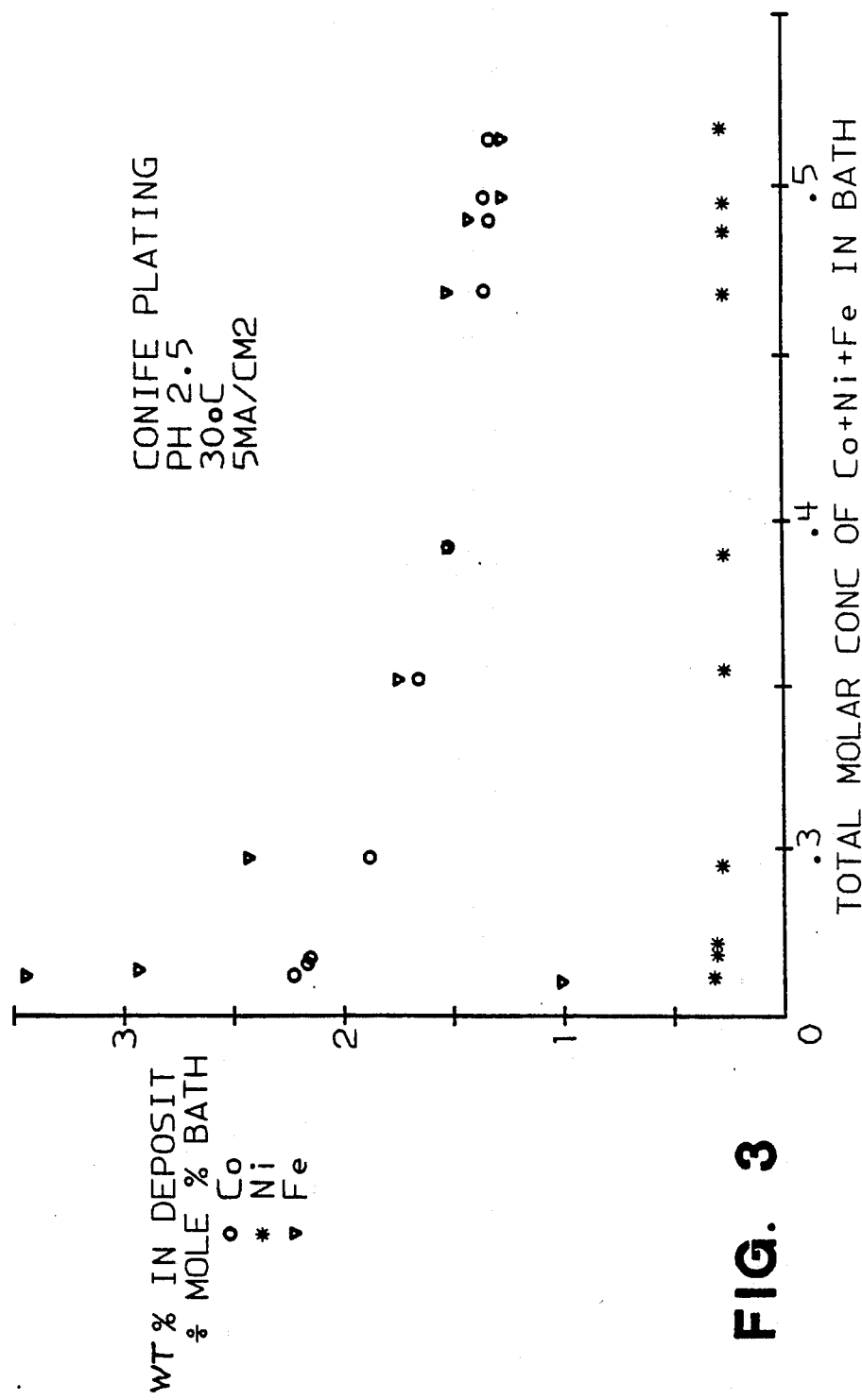
FIG. 3 illustrates a plot of weight percent in deposit divided by mole percentage for total molar concentration of a cobalt-nickel-iron bath.

FIG. 3 illustrates a plot of total molar concentration of the dischargeable ions in the bath. The figure represents a summation of the cobalt, nickel and iron in an alloy composition. The figure illustrates the ratio of the weight percent of the deposit divided by mole percentage in the bath versus the mole concentration of dischargeable ions in the bath. The plot is for a current density of 5 milliamps per centimeter square at a pH 2.5 and at 20 degrees centigrade. The figure provides information for determining concentrations in electroplating bath compositions to obtain a desired composition of deposit.

Figure 4:
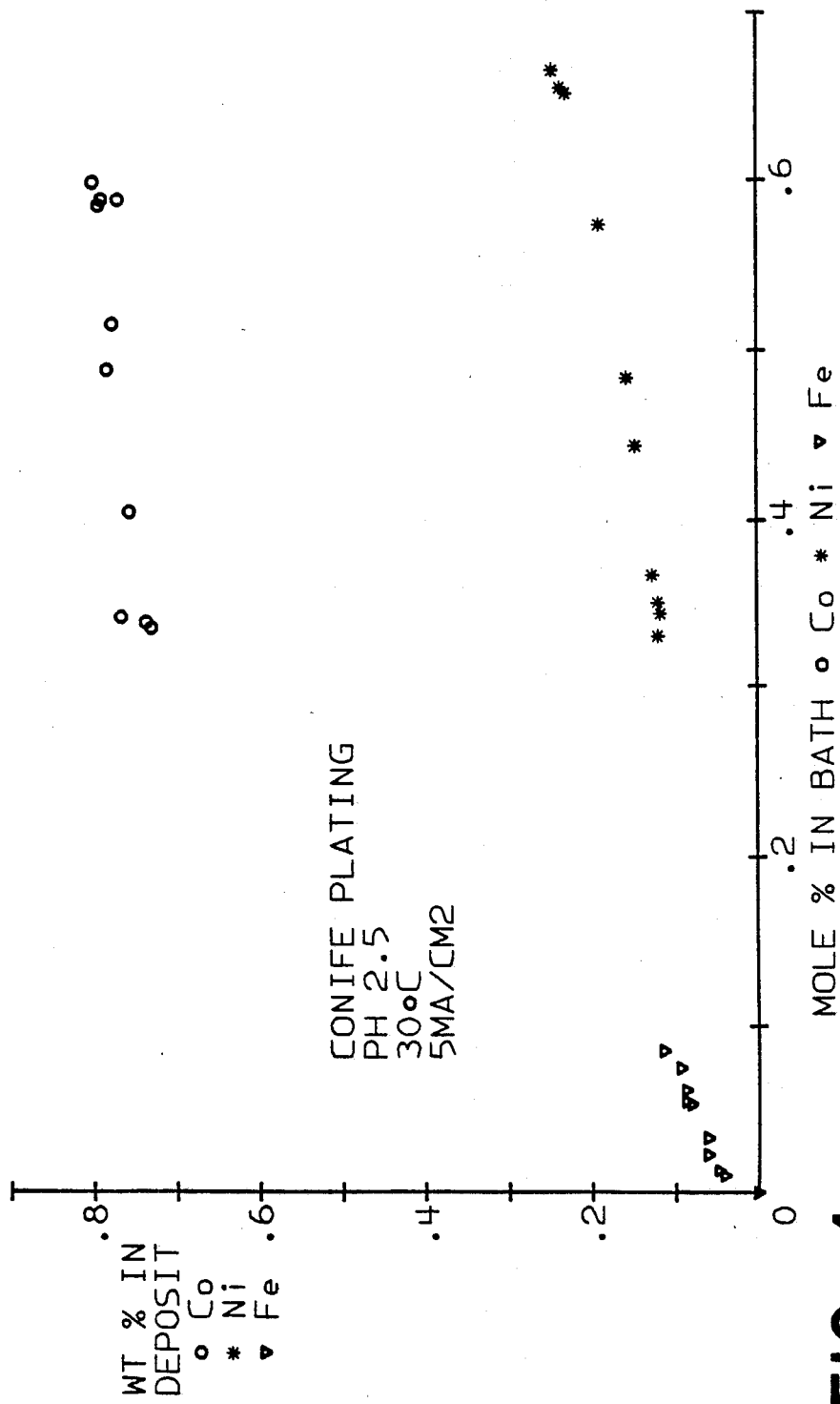
FIG. 4 illustrates a weight percentage in deposit of cobalt-nickel-iron versus mole percentage of a cobalt-nickel-iron bath.

FIG. 4 illustrates a plot of the weight percent of the deposit of cobalt, nickel and iron versus the mole percent in the bath at pH 2.5, 30° C. and 5 milliamps per square centimeter.

Figure 5:
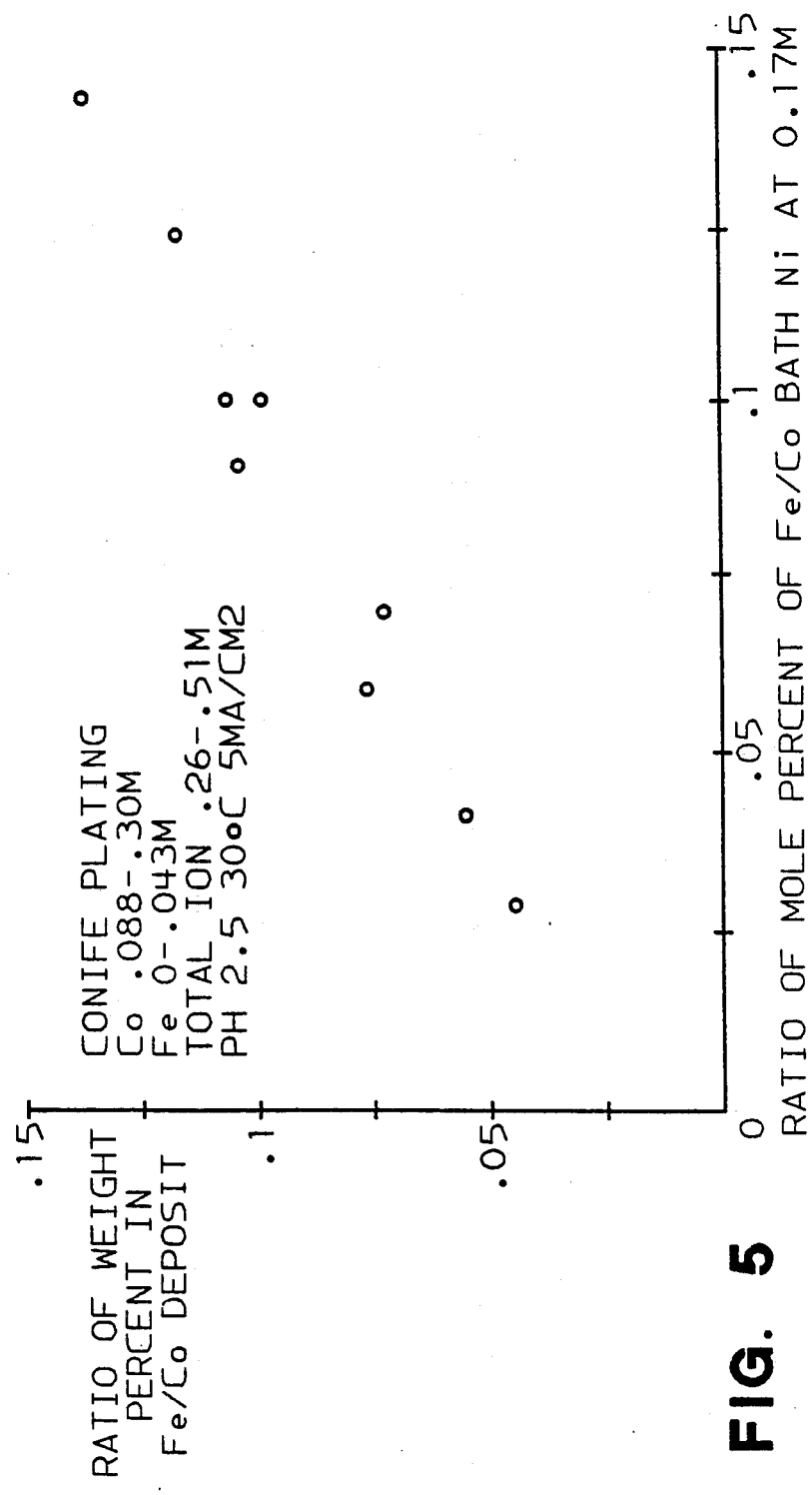
FIG. 5 illustrates a plot of the weight ratio of Fe/Co in the deposit versus molar ratio of Fe/Co in the bath with Ni at 0.17 molar; and, FIG. 6 illustrates a plot of weight percent composition versus current density.

FIG. 5 illustrates a ratio of iron to cobalt in the deposit at the ratio of iron to cobalt in electroplating bath composition where nickel is held constant at 0.17 molar. Essentially, the slope of the graph is about forty-five degrees. As the iron changes, the cobalt, of course, changes. The ratios in the bath of cobalt and iron, and the ratios in deposit are substantially constant at 5 milliamps per centimeter square.

Figure 6:
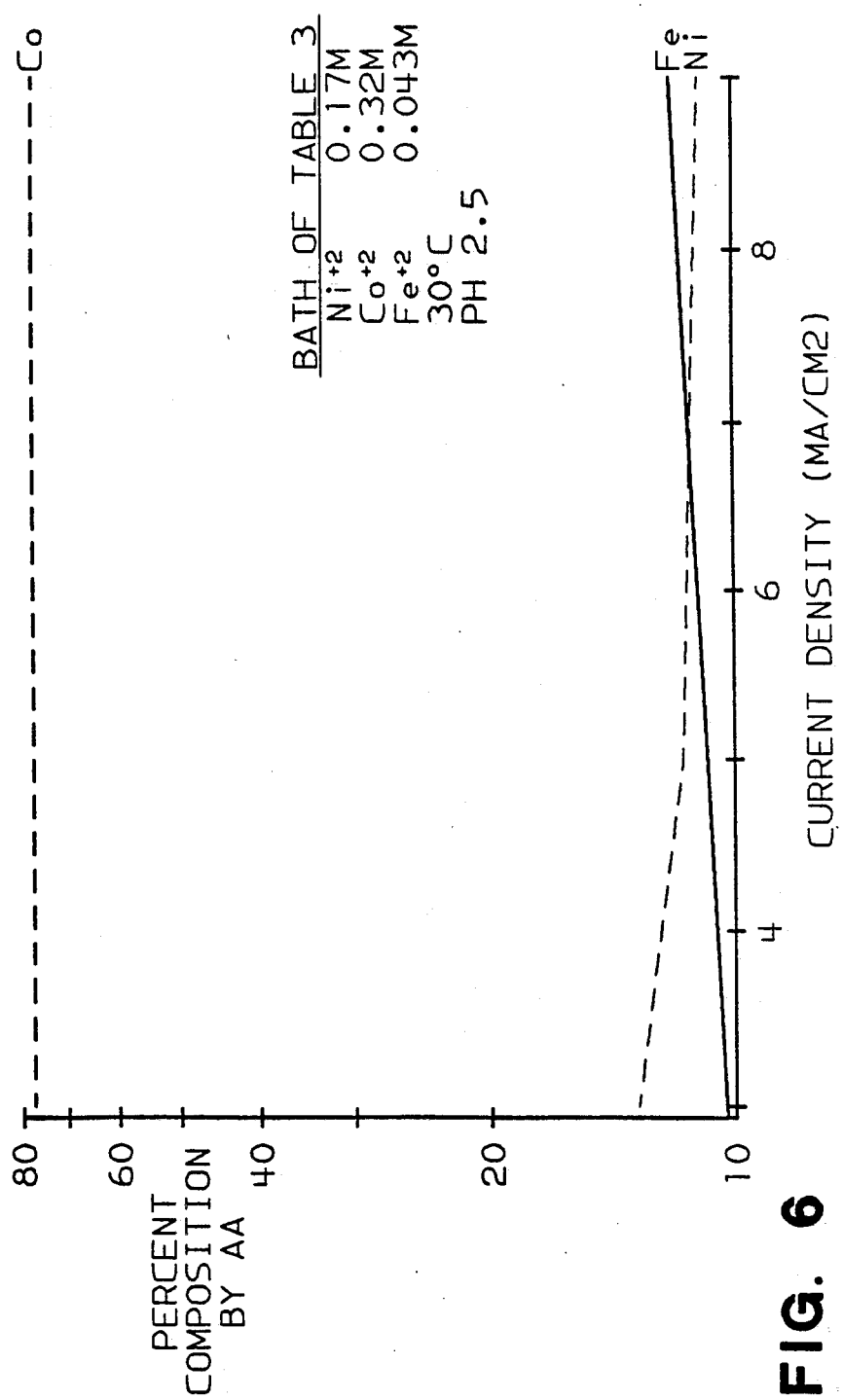

FIG. 6 illustrates a current density study at 0.17 molar nickel, 0.32 molar cobalt, and 0.043 molar iron. The cobalt stays essentially constant at about 7 percent decreasing at about $0.1\%/mA/cm^2$, while the iron content increases at about $0.3\%/mA/cm^2$, while the nickel content decreases at about $0.2\%/mA/CM^2$ during an increase in current density.

MODE OF OPERATION

The preferred electroplating parameters for the bath herein described are a current density is in a range of 3 to 6 milliamps per centimeter square, in a pH range of 2.5 to 3.0, at a temperature at or about 30 degrees centigrade, although other combinations of the parameters can be utilized. The CoNiFe alloy, when plated in a thin film, provides a face centered cubic structure at Fe contents of greater than about 6%, with hexagonal closepacked at Fe contents of less than about 6%. The higher salt electroplating bath composition provides good repeatability from run to run.

One example of typical magnetic properties of CoNiFe film (at about 80,10,10) are set forth in Table 4.

TABLE 4

Thickness = 2 um
$4\pi Ms$ = 16K Gauss
Hc = 1.50 e
Hk = 10.0 e
Permeability = 1000

The current density is at 5 mA/cm² at a pH of 2.5 and a temperature of 30° C. for a deposition rate of 675 angstroms/minute. $H_c$ is coercive force and $H_k$ is anisotropy field and $4\pi M_S$ is saturation magnetization.

Various modifications of the disclosed ranges of the present invention can be extended without departing from the teachings of the present invention.

We claim:

1. CoNiFe electroplating bath composition for producing a magnetic thin film having high saturation magnetization and having a magnetostriction coefficient of substantially zero and low coercivity, said bath including:
   a. dischargeable ions in concentrations in a range of:
      1. $Co^{+2}$ in a range of 0.15-0.4M,
      2. $Ni^{+2}$ in a range of 0.03-0.2M,
      3. $Fe^{+2}$ in a range of 0.1-0.05M;
   b. basic bath without dischargeable ions and including a stress relieving agent and a wetting agent in the ranges of:
      1. $H_3BO_3$ in a range of 10-50 g/l;
      2. NaCl in a range of 0-100 g/l;
      3. stress relieving agent in a range of 0.5-4 g/l; and,
      4. wetting agent in a range of 0.01-0.2 g/l; and,
   c. at a pH of 2.5-3.5.

2. CoNiFe electroplating bath composition for producing a magnetic thin film having high saturation magnetization and a magnetostrictiion coefficient of substantially zero and low coercivity, said bath including the compositons of:
   a. $Co^{+2}$ ions in a concentration of 8 to 25 g/l;
   b. $Ni^{+2}$ ions in a concentration of 1.5 to 12 g/l;
   c. $Fe^{+2}$ ions in a concentration of 0.5 to 3 g/l;
   d. $H_3BO_3$ in a concentration of 10 to 50 g/l;
   e. NaCl in a concentration of 0.5 to 4 g/l;
   f. stress relieving agent in a concentration of 0.5 to 4 g/l; and,
   g. wetting agent in a concentration of 0.01 to 0.2 g/l whereby said bath has a pH of about 2.5 to 3.5.

3. CoNiFe electroplating bath composition for producing a magnetic thin film having high saturation magnetization and a magnetostriction coefficient of substantially zero and low coercivity, said bath in a 25 liter bath including the compositions of:
   a. $CoSo_4.7H_2O$ 2500 g;
   b. $NiCl_2.6H_2O$ 700 g;
   c. $NiSo_4.7H_2O$ 335 g;
   d. $FeSO_4.7H_2O$ 300 g;
   e. $H_3BO_3.7H_2O$ 625 g;
   f. NaCl 625 g;
   g. Stress Relieving Agent 37.5 g;
   h. Wetting Agent 1.25 g; and,
   1. a pH of about 2.5.

4. CoNiFe electroplating bath composition for producing a magnetic thin film having high saturation magnetization and a magnetostriction coefficient of substantially zero and low coercivity, said bath in a 25 liter bath compositions of:
   a. $CoSo_4.7H_2O$ 1200 g;
   b. $NiCl_2.6H_2O$ 200 g;
   c. $FeSO_4.7H_2O$ 100 g;
   d. $H_3BO_3.7H_2O$ 625 g;
   e. NaCl 625 g;
   f. Stress Relieving Agent 37.5 g;
   g. Wetting Agent 1.25 g; and,
   h. a pH of about 2.5.

* * * * *